US008488730B2

(12) United States Patent
Hyoung

(10) Patent No.: US 8,488,730 B2
(45) Date of Patent: Jul. 16, 2013

(54) COMMUNICATION APPARATUS USING SYNCHRONIZED CLOCK SIGNAL

(75) Inventor: Chang Hee Hyoung, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 371 days.

(21) Appl. No.: 12/894,039

(22) Filed: Sep. 29, 2010

(65) Prior Publication Data

US 2011/0080984 A1    Apr. 7, 2011

(30) Foreign Application Priority Data

Oct. 1, 2009 (KR) .................. 10-2009-0094141
Sep. 27, 2010 (KR) .................. 10-2010-0093428

(51) Int. Cl.
*H04L 7/00* (2006.01)
(52) U.S. Cl.
USPC ........................... 375/354; 375/219; 375/259
(58) Field of Classification Search
USPC ................. 375/130, 140, 141, 146, 147, 219, 375/220, 222, 256, 259, 354
See application file for complete search history.

(56) References Cited

U.S. PATENT DOCUMENTS

| 7,561,048 | B2 * | 7/2009 | Yushkov et al. | 340/572.1 |
| 2003/0043949 | A1 * | 3/2003 | O'Toole et al. | 375/374 |
| 2004/0081248 | A1 * | 4/2004 | Parolari | 375/259 |
| 2008/0126560 | A1 | 5/2008 | Takayama et al. | |
| 2008/0238623 | A1 * | 10/2008 | Rofougaran et al. | 340/10.1 |
| 2009/0096612 | A1 * | 4/2009 | Seppa et al. | 340/572.7 |
| 2009/0252205 | A1 * | 10/2009 | Rheinfelder et al. | 375/219 |
| 2010/0026479 | A1 * | 2/2010 | Tran | 340/501 |
| 2010/0254444 | A1 * | 10/2010 | Clausen et al. | 375/220 |

FOREIGN PATENT DOCUMENTS

| KR | 10-0150281 B1 | 6/1998 |
| WO | WO 2009/002009 A1 | 12/2008 |

* cited by examiner

*Primary Examiner* — Dac Ha

(57) ABSTRACT

A communication apparatus using a synchronized clock signal includes: a communication signal generation unit generating one of a baseband signal and a signal obtained by applying digital modulation to the baseband signal, as a communication signal; an interface unit transmitting the generated communication signal and receiving a communication signal from an external source; a communication signal analyzing unit analyzing the received communication signal; a clock signal providing unit providing a clock signal to the communication signal generation unit, the interface unit, and the communication signal analyzing unit; and a controller controlling the communication signal generation unit, the interface unit, the communication signal analyzing unit, and the clock signal providing unit.

18 Claims, 6 Drawing Sheets

COMMUNICATION APPARATUS USING SYNCHRONIZED CLOCK SIGNAL

CROSS-REFERENCE TO RELATED APPLICATIONS

This application claims the priority of Korean Patent Application No. 10-2009-0094141 filed on Oct. 1, 2009 and Korean Patent Application No. 10-2010-0093428 filed on Sep. 27, 2010, in the Korean Intellectual Property Office, the disclosure of which is incorporated herein by reference.

BACKGROUND OF THE INVENTION

1. Field of the Invention

The present invention relates to a communication apparatus using a synchronized clock signal and, more particularly, to a communication apparatus using a synchronized clock signal capable of communicating by a digital signal having orthogonality.

2. Description of the Related Art

In the related art, adjacent devices transmit and receive data to and from each other wirelessly through a conductive channel or the atmosphere, and time-division multiplexing is applied to a digital signal obtained through digital modulation process so as to be used for communication constituting a network of one device and various devices.

However, although a digital signal having orthogonality is in use, when independent networks are in proximity or present on a single channel, symbols, time slots, frame synchronization, and the like, of the two networks are not consistent, failing to maintain orthogonality, so it is therefore difficult to secure stable communication quality.

SUMMARY OF THE INVENTION

An aspect of the present invention provides communication apparatus using a synchronized clock signal capable of communicating a digital signal having orthogonality.

According to an aspect of the present invention, there is provided a communication apparatus using a synchronized clock signal, including: a communication signal generation unit generating one of a baseband signal and a signal obtained by applying digital modulation to the baseband signal, as a communication signal; an interface unit transmitting the generated communication signal and receiving a communication signal from an external source; a communication signal analyzing unit analyzing the received communication signal; a clock signal providing unit providing a clock signal to the communication signal generation unit, the interface unit, and the communication signal analyzing unit; and a controller controlling the communication signal generation unit, the interface unit, the communication signal analyzing unit, and the clock signal providing unit.

The communication signal used by the communication apparatus using a synchronized clock signal may have orthogonality differentiated from a communication signal used by a different communication apparatus using a synchronized clock signal.

The communication signal generation unit may not apply a modulation scheme using a carrier to one of the baseband signal and the signal obtained by applying digital modulation to the baseband signal.

The communication signal generation unit may include a filter for limiting a frequency band of one of the baseband signal and the signal obtained by applying digital modulation to the baseband signal.

The communication signal generation unit may include an amplifier for amplifying one of the baseband signal and the signal obtained by applying digital modulation to the baseband signal.

The interface unit may provide one of near field communication (NFC), radio frequency identification (RFID), and human body communication.

The interface unit may include an antenna for transmitting and receiving a radio signal; and a matching circuit.

The interface unit may further include: an insulating layer for protecting at least one of the antenna and the matching circuit.

The communication apparatus may further include: a display unit visually displaying information regarding the communication apparatus using a synchronized clock signal.

The display unit may share a component with the interface unit.

The communication signal analyzing unit may include at least one of a filter, an amplifier, and a comparator for restoring one of the baseband signal and the signal obtained by applying digital modulation to the baseband signal.

The clock signal providing unit may be provided with a clock signal from an external device.

The communication apparatus using a synchronized clock signal may perform synchronization by using a pilot signal.

The communication apparatus may further include: an external communication unit providing a communication scheme different from a communication scheme using one of the baseband signal and the signal obtained by applying digital modulation to the baseband signal.

The external communication unit may use at least one of a USB, a memory card, IEEE1394, DVI, HDMI, LAN, serial communication, WLAN, ZigBee™, RFID, and Bluetooth™.

The controller may perform authentication for communication using a synchronized clock signal.

The authentication performed by the controller may use an encryption key.

The authentication performed by the controller may use fingerprint recognition.

A payment function may be performed through the authentication performed by the controller.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

The present invention may be modified variably and may have various embodiments, particular examples of which will be illustrated in drawings and described in detail.

However, it should be understood that the following exemplifying description of the invention is not intended to restrict the invention to specific forms of the present invention but rather the present invention is meant to cover all modifications, similarities and alternatives which are included in the spirit and scope of the present invention.

While terms such as "first" and "second," etc., may be used to describe various components, such components must not be understood as being limited to the above terms. The above terms are used only to distinguish one component from another. For example, a first component may be referred to as a second component without departing from the scope of rights of the present invention, and likewise a second component may be referred to as a first component. The term "and/or" encompasses both combinations of the plurality of related items disclosed and any item from among the plurality of related items disclosed.

Unless otherwise defined, all terms used herein, including technical or scientific terms, have the same meanings as those generally understood by those with ordinary knowledge in the field of art to which the present invention belongs. Such terms as those defined in a generally used dictionary are to be interpreted as having meanings equal to the contextual meanings in the relevant field of art, and are not to be interpreted as having ideal or excessively formal meanings unless clearly defined as having such in the present application.

Embodiments of the present invention will be described below in detail with reference to the accompanying drawings, where those components are rendered using the same reference number that are the same or are in correspondence, regardless of the figure number, and redundant explanations are omitted.

Figure 1:
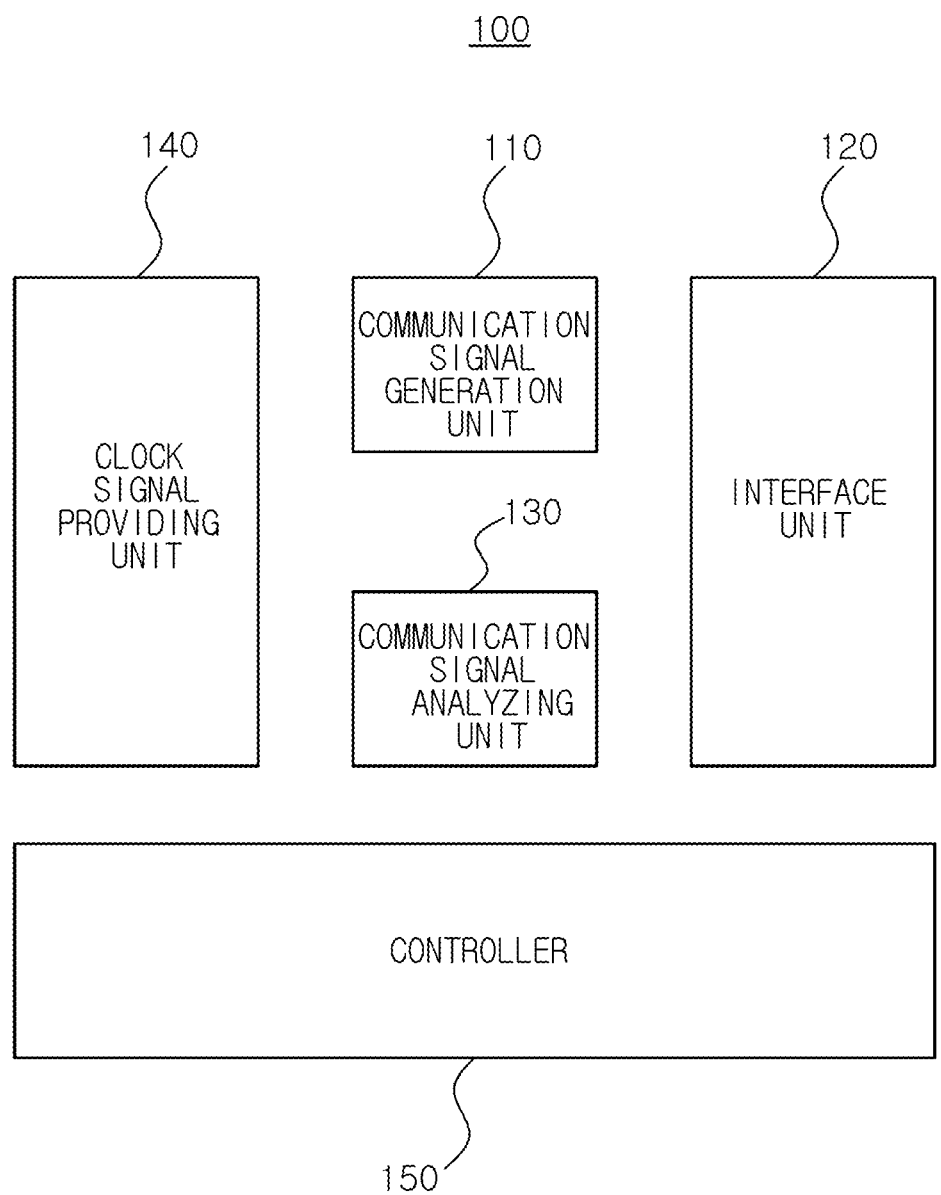
FIG. 1 is a schematic block diagram of a communication apparatus using a synchronized clock signal according to an exemplary embodiment of the present invention.

FIG. 1 is a schematic block diagram of a communication apparatus using a synchronized clock signal according to an exemplary embodiment of the present invention.

With reference to FIG. 1, a communication apparatus 100 using a synchronized clock signal according to an exemplary embodiment of the present invention includes a communication signal generation unit 110 generating one of a baseband signal and a signal obtained by applying digital modulation to the baseband signal, as a communication signal, an interface unit 120 transmitting the generated communication signal and receiving a communication signal from an external source, a communication signal analyzing unit 130 analyzing the received communication signal, a clock signal providing unit 140 providing a clock signal to the communication signal generation unit 110, the interface unit 120, and the communication signal analyzing unit 130, and a controller 150 controlling the communication signal generation unit 110, the interface unit 120, the communication signal analyzing unit 130, and the clock signal providing unit 140.

First, the communication apparatus 100 using a synchronized clock signal according to an exemplary embodiment of the present invention uses a scheme in which a baseband signal or a communication signal obtained by applying a digital modulation process to the baseband signal is transmitted and a received communication signal is restored, rather than using a frequency modulation scheme using a carrier, as a method for transferring high speed data.

Also, the communication signal used in the communication apparatus 100 using a synchronized clock signal according to an exemplary embodiment of the present invention has the characteristics that it has orthogonality differentiated from a communication signal used by a different communication apparatus using a synchronized clock signal.

Namely, a communication signal used by a first communication apparatus and a counterpart communication apparatus is differentiated from a communication signal used by a second communication apparatus and a counterpart communication apparatus, and this results from the fact that the two communication signals have orthogonality to each other.

The communication signal generation unit 110 may generate one of the baseband signal and the signal obtained by applying digital modulation to the baseband signal, as a communication signal.

The communication signal generation unit 110 may not apply a modulation scheme using a carrier to one of the baseband signal and the signal obtained by applying digital modulation to the baseband signal.

Namely, because the communication signal generation unit 110 does not use a frequency-modulated continuous wave (FMCW) scheme used for general radio communication, it does not require a carrier. Thus, a higher data transfer rate can be secured.

For example, the baseband signal and the signal obtained by applying digital modulation to the baseband signal include 0 and 1, used for a digital logic, as a value of voltage, which includes a signal having a TTL or a CMOS level. These signals can be generated through a digital logic circuit.

Modulation through the digital logic circuit includes a spreading process. The generated digital signal has broadband frequency characteristics, so a filter may be configured to limit the frequency band. Upon receiving information, a signal which has undergone a spread spectrum modulation through the digital logic circuit and passed a filter will communicate with an adjacent device through an interface.

The communication signal generation unit 110 may include a filter for limiting a frequency band of one of the baseband signal and the signal obtained by applying digital modulation to the baseband signal.

The signal generated through a digital modulation means basically has a broader bandwidth, and as the signal has a faster rising (or falling) time, it has an even broader bandwidth. This signal may potentially affect an electronic device using a different band, so a filter may be used in order to remove unnecessary electromagnetic waves and effectively use limited frequency resources.

In this case, a low pass filter (LPF), a band pass filter (BPF), a high pass filter (HPF), and a band limiting filter may be selectively used and a cutoff frequency of each filter may be determined in consideration of attenuation of a signal transferred via a channel and the characteristics of the signal input through a receiver. In implementing such filters, the filters may be implemented through both a digital circuit and an analog circuit.

In particular, in the case of communication using a human body as a channel, when a baseband signal and digital signal are output to a human body through an interface from a transmitter, information of a low frequency signal is damaged after the baseband signal and the digital signal pass through a channel and the baseband signal and the digital signal are input to a receiver along with an interference signal induced to the human body from an electronic device.

Thus, the signal which has passed through the human body undergoes much attenuation at a low frequency band, and a great amount of interference signals induced to the human body also exist in the low frequency band. Thus, the existing receiver may be configured by using a high pass filter or a band pass filter in consideration of such characteristics.

Also, the communication signal generation unit 110 may include an amplifier for amplifying any one of the baseband signal and the signal obtained by applying digital modulation to the baseband signal.

The interface unit 120 may transmit the generated communication signal and receive a communication signal from an external source.

The interface unit 120 may provide one of near field communication (NFC), radio frequency identification (RFID), and human body communication.

When the interface unit 120 provides any one of the NFC and the RFID, the interface unit 120 may include an antenna for transmitting and receiving a radio signal and a matching circuit.

When the interface unit 120 provides human body communication, the interface unit 120 may be configured in the form of an electrode based on a contact.

The interface unit 120 may be made of a material having conductivity, installed at an inner side of an implement of the device, and exposed for user convenience. When the interface unit 120 is exposed, it may include an insulating layer for protecting at least one of the antenna and the matching circuit to protect user security and the device.

The interface unit 120 may be configured in the form of a transparent electrode, and in this case, the transparent electrode may have a certain pattern to improve signal transfer characteristics.

The communication signal analyzing unit 130 may analyze a communication signal received through the interface unit 120.

The communication signal analyzing unit 130 may include at least one of a filter, an amplifier, and a comparator in order to restore one of the baseband signal and the signal obtained by applying digital modulation to the baseband signal.

Through a simple structure for restoring a digital signal, the communication signal is input to the filter of the communication signal analyzing unit 130 through the interface. The filter has frequency response characteristics for restoring the transmission signal, and the signal may pass through the amplifier and the comparator so as to be restored as a digital signal.

The restored digital signal passes through a clock and data recovery circuit to restore data and a clock, and the restored digital signal is restored through a digital demodulation means. The clock and data recovery circuit may be omitted when a frequency error correction function is used. Alternatively, a switch for a time division function between transmission and reception may be also used.

The clock signal providing unit 140 may provide a clock signal to the communication signal generation unit 110, the interface unit 120, and the communication signal analyzing unit 130. Namely, the clock signal providing unit 140 may be configured to include an internal clock circuit and provide a signal generated from the internal clock circuit to the communication signal generation unit 110, the interface unit 120, and the communication signal analyzing unit 130.

The clock signal providing unit 140 may receive a clock signal from an external device. Namely, the clock signal providing unit 140 may not include the internal clock signal and may instead receive a clock signal as a reference from the external device and provide the received clock signal to the clock signal providing unit 140.

When a reception side fails to receive a synchronized clock signal, the communication apparatus 100 using the synchronized clock signal may periodically transmit and receive a pilot signal to perform synchronization.

The controller 150 may control the communication signal generation unit 110, the interface unit 120, the communication signal analyzing unit 130, and the clock signal providing unit 140.

Namely, the controller 130, which performs majority of control operations required for the communication apparatus 100 using the synchronized clock signal, may control the communication signal generation unit 110, the interface unit 120, the communication signal analyzing unit 130, and the clock signal providing unit 140, and may further control a display unit 160 and an external communication unit 170 mentioned hereinafter.

In addition, the controller 150 may perform authentication for communication using the synchronized clock signal, and in this case, the authentication may be performed by using an encryption key or fingerprint recognition.

A payment function may be performed through the authentication performed by the controller 150.

Figure 2:
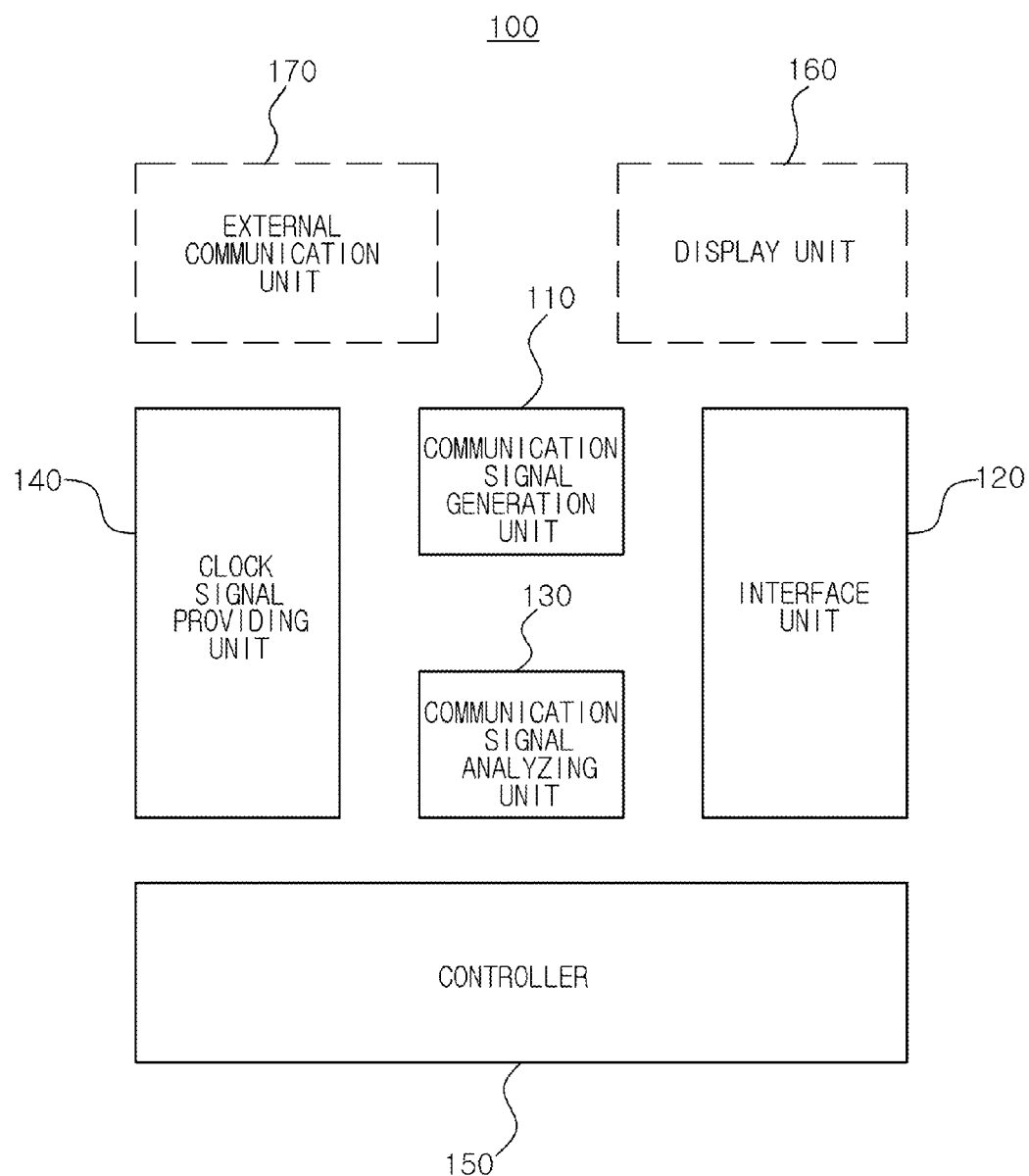
FIG. 2 is a schematic block diagram of a communication apparatus using a synchronized clock signal according to another exemplary embodiment of the present invention.

FIG. 2 is a schematic block diagram of communication apparatus using a synchronized clock signal according to another exemplary embodiment of the present invention.

With reference to FIG. 2, the communication apparatus using a synchronized clock signal according to another exemplary embodiment of the present invention includes the communication signal generation unit 110 generating one of a baseband signal and a signal obtained by applying digital modulation to the baseband signal, as a communication signal, the interface unit 120 transmitting the generated communication signal and receiving a communication signal from an external source, the communication signal analyzing unit 130 analyzing the received communication signal, the clock signal providing unit 140 providing a clock signal to the communication signal generation unit 110, the interface unit 120, and the communication signal analyzing unit 130, and the controller 150 controlling the communication signal generation unit 110, the interface unit 120, the communication signal analyzing unit 130, and the clock signal providing unit 140.

With reference to FIG. 2, the communication apparatus using a synchronized clock signal according to another exemplary embodiment of the present invention may further include a display unit 160 visually displaying information regarding the communication apparatus using a synchronized clock signal.

The display unit 160 may visually display a communication available external device, and may share a component with the interface unit 120.

For example, in the apparatus having the display unit 160, the interface unit 120 may exist on a surface of the display unit 160 to provide a more intuitional service to a user by using a transparent material having conductivity.

An insulating layer may be added to the interface unit 120 existing on the surface of the display unit 160. Alternatively, a conductive film required for configuring the display unit 160 may be used as the interface unit 120.

The configuration of a general flat panel display device uses the principle in which a plurality of horizontal transparent electrodes and a plurality of vertical transparent electrodes are formed such that when a signal is applied to some of the electrodes, corresponding cells are illuminated to thus display image information, and the transparent electrode used here may be used as the interface unit 120.

The display unit 160 includes a function of recognizing a user's contact and an input pattern. Thus, in order to recognize a user's contact, a transparent conductive layer is formed on an image display device of the display unit 160, and in this case, the interface unit 120 may be configured to recognize a user's contact by using the transparent conducive layer and transmit a digital signal through the transparent electrode of the recognized contact.

In the communication apparatus 100 using a synchronized clock signal, when an icon, a button, or the like, of the display unit 160 is used, a plurality of small electrodes existing in the display unit 160 may be used as an antenna pattern of the interface unit 120.

With reference to FIG. 2, the communication apparatus 100 using a synchronized clock signal according to another exemplary embodiment of the present invention may further include an external communication unit 170 providing a communication scheme different from the communication scheme using any one of the baseband signal and the signal obtained by applying digital modulation to the baseband signal.

The external communication unit 170 may use at least one of a USB, a memory card, IEEE1394, DVI, HDMI, LAN, serial communication, WLAN, ZigBee™, RFID, and Bluetooth™.

Figure 3:
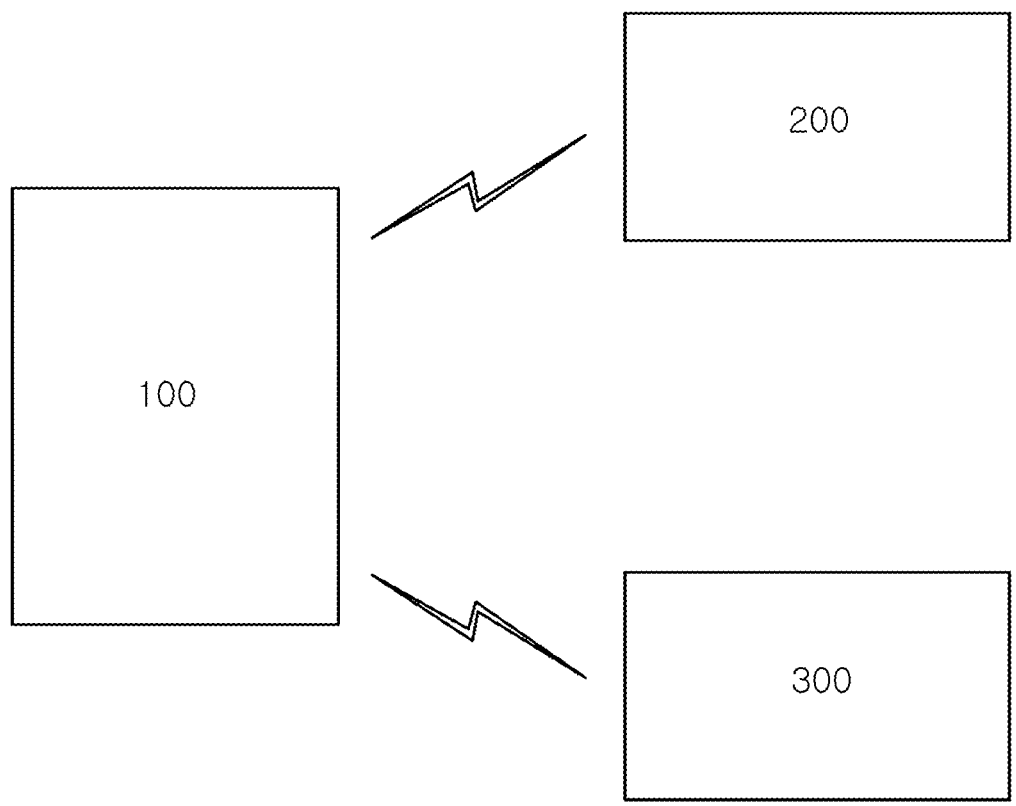
FIG. 3 is a view for explaining the provision of a near field communication service by a communication apparatus using a synchronized clock signal according to an exemplary embodiment of the present invention.

FIG. 3 is a view for explaining the provision of a near field communication service by a communication apparatus using a synchronized clock signal according to an exemplary embodiment of the present invention.

With reference to FIG. 3, the communication apparatus 100 using a synchronized clock signal according to an exemplary embodiment of the present invention may provide any one of near field communication (NFC) and radio frequency identification (RFID).

The use of the NFC and the RFID techniques allows for bi-directional communications to transmit and receive an address list, games, MP3 files, etc., as well as phone numbers, between two or more communication technique supporting terminals using a synchronized clock signal by simply bringing them into proximity, without a user's artificial manipulation.

For example, the communication apparatus 100 using a synchronized clock signal can freely communicate with a second communication apparatus 200 using the synchronized clock signal and a third communication apparatus 300 using the synchronized clock signal through one of the NFC and the RFID techniques.

Figure 4:
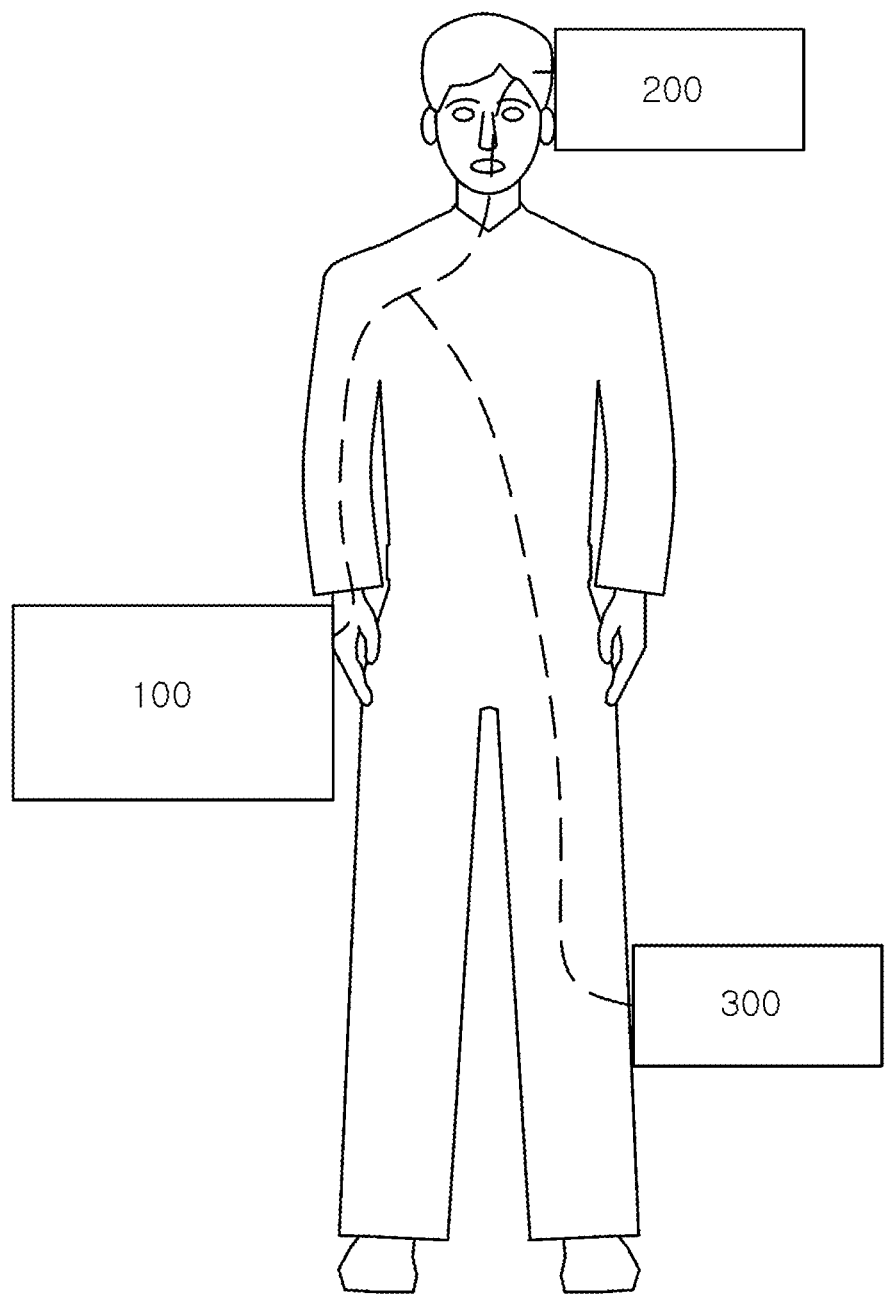
FIG. 4 is a view for explaining the provision of a human body communication service by a communication apparatus using a synchronized clock signal according to an exemplary embodiment of the present invention.

FIG. 4 is a view for explaining the provision of a human body communication service by a communication apparatus using a synchronized clock signal according to an exemplary embodiment of the present invention.

With reference to FIG. 4, the communication apparatus 100 using a synchronized clock signal according to an exemplary embodiment of the present invention may provide human body communication.

Human body communication refers to a technique of transmitting data such as photos, videos, MP3, and the like, by using a human body, or human body part such as an arm, leg, and so on, as a transmission medium. Because the human body communication technique uses current conductive to a human body by using the human body as a medium material in the manner of a wire, or the like, without consuming power, various types of data (including photos, videos, sound sources, etc.) can be transmitted by simply touching a user's finger or by handshaking without using the Internet.

For example, the communication apparatus 100 using the synchronized clock signal may transmit and receive various data (including photos, videos, sound sources, etc.) to and from the second communication apparatus 200 using the synchronized clock signal and the third communication apparatus 300 using the synchronized clock signal through human body communication.

Figure 5:
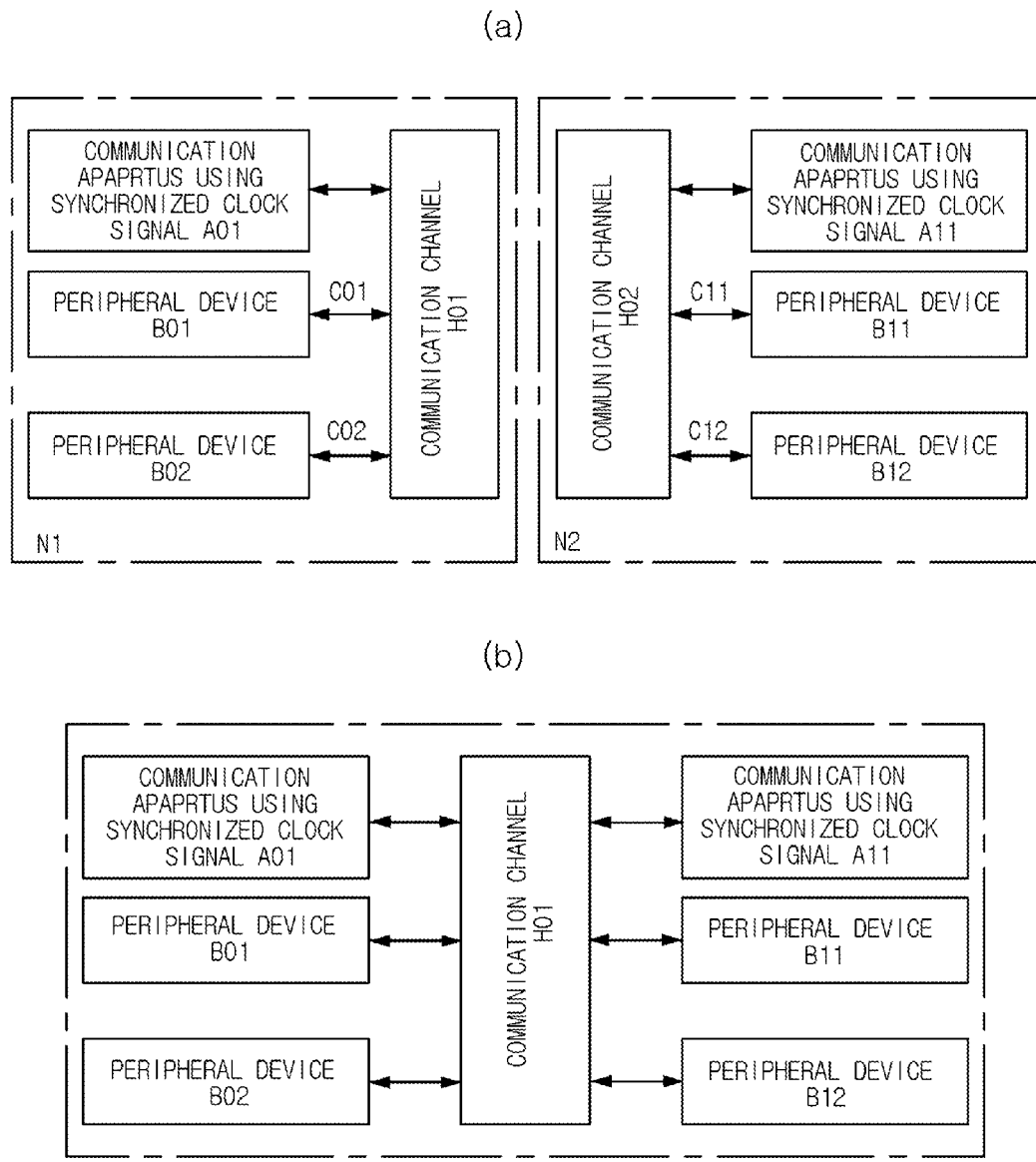
FIG. 5 shows an example of a network formed by a communication apparatus using a synchronized clock signal according to an exemplary embodiment of the present invention.

FIG. 5 shows an example of a network formed by a communication apparatus using a synchronized clock signal according to an exemplary embodiment of the present invention.

With reference to FIG. 5, the communication device using a synchronized clock signal may build a network with one or more peripherals, and one or more new peripherals may build a different network including the communication device using a synchronized clock signal.

On the assumption that the two networks are close to each other or share a single channel, when the communication apparatus uses the synchronized clock signal, it generates a signal according to one of a symbol, time slot, and frame synchronization, and even when two independent networks exist in a single channel, the network can be continued by using orthogonal signals without affecting each other.

When these characteristics are in use, for a digital signal which has not undergone a frequency-modulated continuous wave (FMCW) process, the conventional techniques use the time division scheme in order to perform communication with several terminals, while the technique according to an exemplary embodiment of the present invention can employ CDMA in which a digital signal is directly transferred and one device can simultaneously communicate with several other devices by using signals having orthogonality, without performing the FMCW process.

This means that multiple accesses can be available among communication apparatus using a synchronized clock signal of several users, rather than a base station-based multi-access, in a single base station used by the existing mobile communication.

When human body communication is applied, a user having several networks may continuously communicate with a different user having other several networks through a contact or a close proximity even when the networks of the two groups share a single channel, without interfering with each other.

With reference to FIG. 5(*a*), a communication apparatus A01 and a peripheral B01, each of which has a clock signal providing unit and uses a synchronized clock signal, form communication through a signal C01, and a peripheral B02 performs communication by using a signal C02.

The two networks may communicate with each other by sharing a communication channel H01 according to the existing time division scheme. When the signals C01 and C02 have orthogonality, the two signals can form communication through the communication channel H01, respectively, which is denoted as a network N1.

When a network N2 having a similar configuration is close to the network N1, because the networks N1 and N2, which perform communication by using digital signals, share a similar frequency band at the same time, causing interference to each other to degrade communication quality.

Although the networks are built through the time division scheme, because the networks N1 and N2 do not share a time table, degradation of communication quality is inevitable.

When the two networks N1 and N2 do not have a clock signal providing unit, although all the signals C01 to C02 and C11 and C12 used for communication have orthogonality, if a frame (or slot, symbol, chip) synchronization is not matched, the orthogonality is not maintained.

Thus, when the two networks are in proximity or come into contact, communication quality may be degraded or interrupted for a moment.

With reference to FIG. 5(b), two networks come into closer contact, showing the phenomenon in which the communication channel H01 is like an air in a radio environment or as if two users using their bodies as communication channels become a single communication channel through contact.

Even in the occurrence of the case illustrated in FIG. 5(b), if the communication apparatus A01 and A11, each using a synchronized clock signal, have a clock signal providing unit as an element of a synchronization system and a frame synchronization is matched, the two networks sharing a single channel could possibly communicate without causing interference with each other.

Meanwhile, with reference to FIG. 5(a), when the two independent networks have a clock signal providing unit but use the same code, a hopping technique may be applied to the code in use as a method for preventing the two networks in proximity from using the same code in the same channel and increasing the number of devices that can participate in the network.

In the device having a synchronized system, at least one code may be used to recognize a status of a different network. In this case, when two networks are in proximity or share a single channel, the networks may provide information regarding a code used by the respective networks or exchange time information in use or time information that can be used, and hopping table information of codes having orthogonality, to thus guarantee the communication quality. As the code for recognizing the status of a different network, one of the codes having orthogonality can be selectively used.

Figure 6:
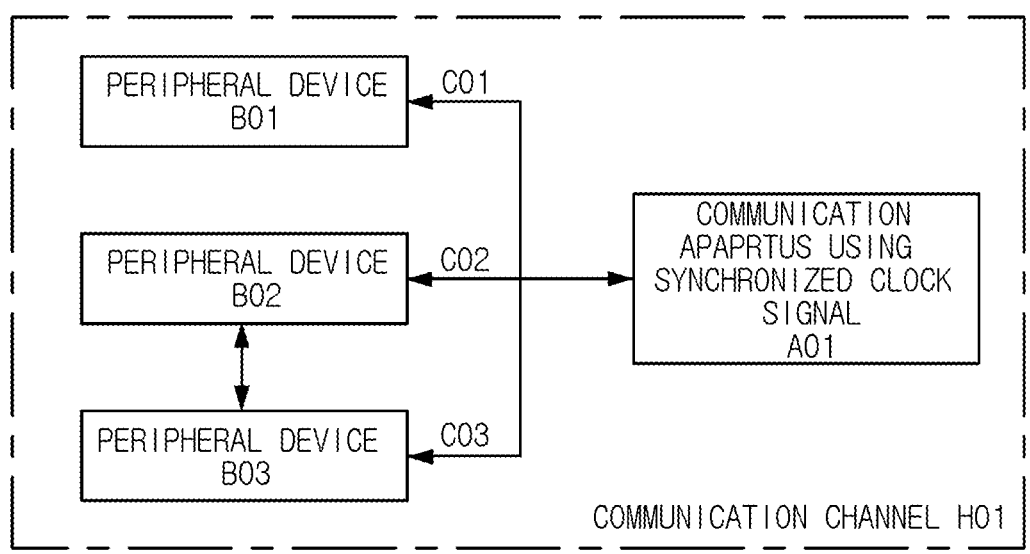
FIG. 6 shows an example of a sensor network utilizing a communication apparatus using a synchronized clock signal according to an exemplary embodiment of the present invention.

FIG. 6 shows an example of a sensor network utilizing a communication apparatus using a synchronized clock signal according to an exemplary embodiment of the present invention.

With reference to FIG. 6, when a device, like a sensor network, administering several nodes (or slaves) is called a coordinator (or master), communication can be performed among the nodes on the basis of a synchronized system.

FIG. 6 illustrates a structure in which a coordinator (a communication device A01 using a synchronized clock signal) and sensor nodes (peripherals B01 to B03) form a sensor network through a communication channel H01.

The coordinator can communicate with the sensor node B01 by a signal C01, with the sensor node B02 by a signal C02, and with the sensor node B03 by a signal C03. When a node, which has obtained synchronization information from the coordinator A01 having a clock signal providing unit, wants to transfer data to a different node, it may be allocated a channel from the coordinator A01 and transfer the data to a target node through the coordinator A01. Or, a more effective method may be used.

Because signals generated by the respective sensor nodes through a synchronized clock are synchronized, the sensor nodes can communicate with each other by using a signal having orthogonality without passing through the coordinator. Or, the sensor nodes may communicate with each other by using time table information sent by the coordinator according to a time division scheme.

As set forth above, according to exemplary embodiments of the invention, the communication apparatus using a synchronized clock signal can overcome a low data transfer rate, the problem of the related art communication apparatus. Namely, the communication apparatus using a synchronized clock signal can exhibit high speed data transmission characteristics as well as a low speed data transmission, and can provide diverse services by using the high speed data transmission characteristics. In addition, a device having a synchronization system uses a synchronized clock and a digital signal having orthogonality created through a digital modulation process to thus secure continuous communication quality in an adjacent network and between or among various networks existing in a single channel.

While the present invention has been shown and described in connection with the exemplary embodiments, it will be apparent to those skilled in the art that modifications and variations can be made without departing from the spirit and scope of the invention as defined by the appended claims.

What is claimed is:

1. A communication apparatus using a synchronized clock signal, the apparatus comprising:
   a communication signal generation unit generating one of a baseband signal and a signal obtained by applying digital modulation to the baseband signal, as a communication signal;
   an interface unit transmitting the generated communication signal and receiving a communication signal from an external source;
   a communication signal analyzing unit analyzing the received communication signal;
   a clock signal providing unit providing a clock signal to the communication signal generation unit, the interface unit, and the communication signal analyzing unit; and
   a controller controlling the communication signal generation unit, the interface unit, the communication signal analyzing unit, and the clock signal providing unit;
   wherein the communication signal used by the communication apparatus using a synchronized clock signal has orthogonality differentiated from a communication signal used by a different communication apparatus using a synchronized clock signal.

2. The apparatus of claim 1, wherein the communication signal generation unit does not apply a modulation scheme using a carrier to one of the baseband signal and the signal obtained by applying digital modulation to the baseband signal.

3. The apparatus of claim 1, wherein the communication signal generation unit comprises a filter for limiting a frequency band of one of the baseband signal and the signal obtained by applying digital modulation to the baseband signal.

4. The apparatus of claim 1, wherein the communication signal generation unit comprises an amplifier for amplifying one of the baseband signal and the signal obtained by applying digital modulation to the baseband signal.

5. The apparatus of claim 1, wherein the interface unit provides one of near field communication (NFC), radio frequency identification (RFID), and human body communication.

6. The apparatus of claim 5, wherein the interface unit comprises an antenna for transmitting and receiving a radio signaland a matching circuit.

7. The apparatus of claim 6, wherein the interface unit further comprises an insulating layer for protecting at least one of the antenna and the matching circuit.

8. The apparatus of claim 1, wherein the communication apparatus further comprises a display unit visually displaying information regarding the communication apparatus using a synchronized clock signal.

9. The apparatus of claim 8, wherein the display unit shares a component with the interface unit.

10. The apparatus of claim 1, wherein the communication signal analyzing unit comprises at least one of a filter, an amplifier, and a comparator for restoring one of the baseband signal and the signal obtained by applying digital modulation to the baseband signal.

11. The apparatus of claim 1, wherein the clock signal providing unit is provided with a clock signal from an external device.

12. The apparatus of claim 1, wherein the communication apparatus using a synchronized clock signal performs synchronization by using a pilot signal.

13. The apparatus of claim 1, further comprising:
an external communication unit providing a communication scheme different from a communication scheme using one of the baseband signal and the signal obtained by applying digital modulation to the baseband signal.

14. The apparatus of claim 13, wherein the external communication unit uses at least one of a USB, a memory card, IEEE1394, DVI, HDMI, LAN, serial communication, WLAN, ZigBee™, RFID, and Bluetooth™.

15. The apparatus of claim 1, wherein the controller performs authentication for communication using a synchronized clock signal.

16. The apparatus of claim 15, wherein the authentication performed by the controller uses an encryption key.

17. The apparatus of claim 15, wherein the authentication performed by the controller uses fingerprint recognition.

18. The apparatus of claim 1, wherein a payment function is performed through the authentication performed by the controller.

* * * * *